United States Patent
Ono et al.

(10) Patent No.: US 6,490,286 B1
(45) Date of Patent: Dec. 3, 2002

(54) SHORT CELL MULTIPLEXING APPARATUS

(75) Inventors: Hideaki Ono, Kawasaki (JP); Ryuichi Takechi, Kawasaki (JP); Toru Fujisawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/152,179

(22) Filed: Sep. 11, 1998

(30) Foreign Application Priority Data

Mar. 10, 1998 (JP) .......................................... 10-058708

(51) Int. Cl.$^7$ .............................................. H04L 12/56
(52) U.S. Cl. ............................ 370/395.31; 370/395.61; 370/395.64
(58) Field of Search ............................... 370/395.1, 397, 370/395.31, 395.64, 535, 470, 471, 399, 395.3, 395.6, 395.61

(56) References Cited

U.S. PATENT DOCUMENTS

| | | | |
|---|---|---|---|
| 5,623,493 A | | 4/1997 | Kagemoto |
| 5,953,339 A | * | 9/1999 | Baldwin et al. ............. 370/397 |
| 6,041,054 A | * | 3/2000 | Westberg ..................... 370/389 |
| 6,075,798 A | * | 6/2000 | Lyons et al. ................. 370/474 |
| 6,154,448 A | * | 11/2000 | Petersen et al. ............. 370/248 |
| 6,169,738 B1 | * | 1/2001 | Sriram et al. ................ 370/395 |
| 6,195,353 B1 | * | 2/2001 | Westberg ..................... 370/395 |
| 6,266,343 B1 | * | 7/2001 | Caves ........................... 370/466 |

FOREIGN PATENT DOCUMENTS

| | | |
|---|---|---|
| JP | 5268241 | 10/1993 |
| JP | 7131460 | 5/1995 |

\* cited by examiner

*Primary Examiner*—Chau Nguyen
*Assistant Examiner*—Soon-Dong Hyun
(74) *Attorney, Agent, or Firm*—Katten Muchin Zavis Rosenman

(57) ABSTRACT

A first header converting section outputs, when partial fill cells are inputted to the first header converting section the partial fill cells, while converting a VPI of each of the partial fill cells into a value that is a unit of a multiplexing process at a short cell multiplexing section and converting a VCI of each of the partial fill cells into a value to be a CID which is to be stored in a short cell at the short cell multiplexing section. The short cell multiplexing section receives a plurality of the partial fill cells from the first header converting section to multiplex a plurality of the short cells within the partial fill cells for every VPI of the partial fill cells, and produces an AAL Type 2 cell in which the VCIs of the partial fill cells are stored as CIDs and the VPIs of the partial fill cells are stored as VCIs. A second header converting section receives the AAL Type 2 cell from the short cell multiplexing section and outputs the AAL Type 2 cell while converting the VPI/VCI of the AAL Type 2 cell into given values.

11 Claims, 20 Drawing Sheets

FIG.3

| | FIRST HEADER CONVERTING SECTION | | SHORT CELL MULTIPLEXING SECTION | | SECOND HEADER CONVERTING SECTION | |
|---|---|---|---|---|---|---|
| | BEFORE CONVERSION | AFTER CONVERSION | INPUT | OUTPUT | BEFORE CONVERSION | AFTER CONVERSION |
| VPI | ARBITRARINESS | MULTIPLEXING UNIT SERIAL NUMBER | | ↗ | | DESIRED VPI |
| VCI | ARBITRARINESS | CONVERTED CID | | ↗ | | DESIRED VCI |
| CID | — | (THROUGH) | d.c. | | — | (THROUGH) |

FIG.6

|  | FIRST HEADER CONVERTING SECTION | | SHORT CELL DEMULTIPLEXING SECTION | | SECOND HEADER CONVERTING SECTION | |
|---|---|---|---|---|---|---|
|  | BEFORE CONVERSION | AFTER CONVERSION | INPUT | OUTPUT | BEFORE CONVERSION | AFTER CONVERSION |
| VPI | ARBITRARINESS | 0 | ↗ | ↗ | — | DESIRED VPI |
| VCI | ARBITRARINESS | CONVERTED VPI AT DEMULTIPLEXING SECTION | ↗ | ↗ | — | DESIRED VCI |
| CID | — | (THROUGH) | d.c. | d.c. | — | (THROUGH) |

|  |  | FIRST HEADER CONVERTING SECTION | | SHORT CELL MULTIPLEXING /DEMULTIPLEXING SECTIONS | | SECOND HEADER CONVERTING SECTION | |
|---|---|---|---|---|---|---|---|
|  |  | BEFORE CONVERSION | AFTER CONVERSION | INPUT | OUTPUT | BEFORE CONVERSION | AFTER CONVERSION |
| MULTIPLEXING SIDE | VPI | ARBITRARINESS | CONVERTED INTO MULTIPLEXING PROCESS UNIT |  | 100 | ✕ | DESIRED VPI |
|  | VCI | ARBITRARINESS | CONVERTED CID AT MULTIPLEXING SECTION |  |  | ✕ | DESIRED VCI |
|  | CID | — | (THROUGH) | d.c. |  | — | (THROUGH) |
| DEMULTIPLEXING SIDE | VPI | ARBITRARINESS | CONVERTED VPI AT DEMULTIPLEXING SECTION |  |  | ✕ | DESIRED VPI |
|  | VCI | ARBITRARINESS | 100 |  |  | ✕ | DESIRED VCI |
|  | CID | — | (THROUGH) |  | d.c. | — | (THROUGH) |

FIG. 9

| | | FIRST HEADER CONVERTING SECTION | | SHORT CELL MULTIPLEXING /DEMULTIPLEXING SECTIONS | | SECOND HEADER CONVERTING SECTION | |
|---|---|---|---|---|---|---|---|
| | | BEFORE CONVERSION | AFTER CONVERSION | INPUT | OUTPUT | BEFORE CONVERSION | AFTER CONVERSION |
| MULTIPLEXING SIDE | VPI | ARBITRARINESS | CONVERTED INTO VPI SHOWING MULTIPLEXING PROCESS UNIT | | 0 | ✕ | DESIRED VPI |
| | VCI | ARBITRARINESS | CONVERTED CID AT MULTIPLEXING SECTION | | | ✕ | DESIRED VCI |
| | CID | — | (THROUGH) | d.c. | | — | (THROUGH) |
| DEMULTIPLEXING SIDE | VPI | ARBITRARINESS | 0 | | | ✕ | DESIRED VPI |
| | VCI | ARBITRARINESS | CONVERTED VPI AT DEMULTIPLEXING SECTION | | | ✕ | DESIRED VCI |
| | CID | — | (THROUGH) | | d.c. | — | (THROUGH) |

FIG. 11

|  |  | FIRST HEADER CONVERTING SECTION | | SHORT CELL MULTIPLEXING /DEMULTIPLEXING SECTIONS | | SECOND HEADER CONVERTING SECTION | |
|---|---|---|---|---|---|---|---|
|  |  | BEFORE CONVERSION | AFTER CONVERSION | INPUT | OUTPUT | BEFORE CONVERSION | AFTER CONVERSION |
| MULTIPLEXING SIDE | VPI | ARBITRARINESS | CONVERTED INTO VPI SHOWING MULTIPLEXING PROCESS UNIT |  |  | ✕ | DESIRED VPI |
|  | VCI | ARBITRARINESS | CONVERTED CID AT MULTIPLEXING SECTION |  | 0 |  | DESIRED VCI |
|  | CID | - | (THROUGH) | d.c. |  | - | (THROUGH) |
| DEMULTIPLEXING SIDE | VPI | ARBITRARINESS | 0 |  |  | ✕ | DESIRED VPI |
|  | VCI | ARBITRARINESS | CONVERTED VPI AT DEMULTIPLEXING SECTION |  |  |  | DESIRED VCI |
|  | CID | - | (THROUGH) |  | d.c. | - | (THROUGH) |
| EXCEPT ABOVE | VPI, VCI | ARBITRARINESS | VALUE NOT USED IN ABOVE (VPI=200) |  |  | ↑ | DESIRED VPI, VCI |

FIG. 14

| ABBREVIATION | NUMBER OF BITS | CONTENTS | REMARKS |
|---|---|---|---|
| VPI | 12 | VIRTUAL PATH IDENTIFIER | |
| VCI | 16 | VIRTUAL CHANNEL IDENTIFIER | |
| PTI | 3 | PAYLOAD TYPE IDENTIFIER | |
| CLP | 1 | CELL LOSS PRIORITY | |
| HEC | 8 | HEADER ERROR CONTROL | |
| OSF | 6 | OFFSET FIELD (SHORT CELL INITIAL POINTER) (0-47) OSF=0: SHORT CELL MAPPING IMMEDIATELY AFTER START FIELD OSF=47: NO DISCONNECTION IN SHORT CELL IN SUBJECT CELL | DO NOT USE OSF=48 OR MORE |
| SN | 1 | 1 BIT SEQUENCE NUMBER (0,1,0,1,...) | MODULO 2 |
| P | 1 | PARITY (ODD PARITY WITH RESPECT TO 7 BITS, OSF SN TOTAL) | |
| CID | 8 | SHORT CELL CONNECTION IDENTIFIER | |
| LI | 6 | SHORT CELL PAYLOAD LENGTH INDICATION (0-44) (0: MEANS PAYLOAD LENGTH 1 BYTE) | |
| UUI | 2 | USER-USER IDENTIFICATION (HIGH-ORDER SIDE) | |
| UUI | 3 | USER-USER IDENTIFICATION (LOW-ORDER SIDE) | |
| S-HEC | 5 | SHORT CELL HEADER ERROR CONTROL (PRODUCING POLYNOMIAL $X$ RAISED TO FIFTH POWER + $X$ RAISED TO SECOND POWER + 1) | |

FIG. 19
PRIOR ART

SHORT CELL MULTIPLEXING APPARATUS

BACKGROUND OF THE INVENTION

The present invention relates to a short cell multiplexing apparatus for routing a short cell by using an asynchronous transfer mode (ATM) switching system.

Upon carrying out communication by an ATM, data is loaded in an ATM cell which is a unit of data switching. The ATM cell is transmitted through an ATM connection setting previously. The ATM cell is, when transmitted within the ATM network, allocated with one destination information (virtual path identifier/virtual channel identifier (VPI/VCI)) per connection. The VPI/VCI is loaded in the header of the ATM cell. The ATM cell is transmitted through the ATM connection corresponding to the VPI/VCI.

In the technical field relating to mobile communication, data is converted into a compressed low-bit rate data format for its transmission so that a transmission band may effectively be used. If the low-speed bit rate information is loaded into the payload of a standard ATM cell, much time is required so that the payload of one ATM cell is filled with data. For this reason, there is a fear that there occurs a delay of data transmission and a drop of communication quality.

Under the above circumstances, a multiplexing transfer system called AAL Type 2 serving as a system capable of transmitting low-bit rate information with less delay has been investigated while focusing on ITU-T. FIG. 18 is diagram showing an ATM cell of AAL Type 2 format (hereinafter referred to as AAL Type 2 cell) having multiplexed short cells in the payload. FIG. 19 is a table showing header information stored in the AAL Type 2 cell and the short cell in FIG. 18. The AAL Type 2 format has recently been recommended as the ATM cell for transmitting a plurality of short cells.

As showing in FIG. 18, the header of the AAL Type 2 cell has each field of the standard cell header (5 byte) and each field of OSF, SN, P (1 byte). Consequently, the AAL Type 2 cell differs from the standard cell in payload length (47 bytes).

The short cell consists of a short cell header and a short cell payload. A short cell connection identifier (CID) for identifying short cell connection and a length indicator (LI) for indicating the payload length of the short cell are loaded in the short cell header. On the other hand, the low-bit rate information mentioned above is loaded in the short cell payload. Hereinafter, "AAL Type 2 cell" is prescribed to mean an AAL Type 2 cell storing a plurality of short cells.

However, upon transmitting the AAL Type 2 cell by using the ATM connection as described above, there occurred the following problems. Namely, a plurality of short cells having different CIDs are multiplexed in the payload of the AAL Type 2 cell. Therefore, each short cell is not transmitted to a desired destination unless an ATM switching apparatus carries out switching per short cell. However, conventional ATM switching apparatuses do not comprise a function for switching each short cell in the ATM cell for every short cell.

In this case, if the ATM switching apparatus has a function of carrying out the switching per short cell by processing to the AAL type 2 cell, it is preferable that a constitution of the ATM switching apparatus may be simple. For example, when a AAL type 2 cell is inputted to a ATM switching apparatus, if the ATM switching apparatus extracts a plurality of short cells, generates standard ATM cells storing a short cell among the extracted short cells (hereafter, this standard ATM cell is called "partial fill cell": see in FIG. 18), and carries out switching per partial fill cell, the ATM switching apparatus is able to realize switching per short cell. An apparatus converting partial fill cells into a AAL type 2 cell is called a short cell multiplexing apparatus. An apparatus converting a AAL type 2 cell into partial fill cell is called a short cell demultiplexing apparatus.

The short cell multiplexing apparatus has to have a function that when partial fill cells converted a AAL type 2 cell, new destination information is given the AAL type 2 cell. The new destination information has to uniquely identify per call (connection).

An ATM switching apparatus has a table memorizing an input side VPI/VCI and an output side VPI/VCI corresponding to the input side VPI/VCI. When a standard ATM cell is inputted to the ATM switching apparatus, the ATM switching apparatus reads out an output side VPI/VCI corresponding to a VPI/VCI in the standard ATM cell (input side VPI/VCI) from the table, and replaces the input side VPI/VCI in the standard ATM cell to the output side VPI/VCI (header conversion). Hereafter, the ATM switching apparatus determines the output path of the standard ATM cell in accordance with the output side VPI/VCI (routing), and transmits the ATM cell from the output path.

FIGS. 20(A), (B) is diagram showing an example of a header conversion apparatus 101. As shown in FIG. 20(A), the header conversion apparatus 101 has a header conversion table 102 storing a new VPI, VCI, CID (an output side VPI, VCI, CID) corresponding to the input side VPI, VCI. When a partial fill cell is inputted to the header conversion apparatus 101, the header conversion apparatus 101 obtains the input side VPI, VCI from the partial fill cell, reads out a new VPI, VCI, CID as data corresponding to the input side VPI, VCI as an address from the header conversion table 102. The new VPI, VCI, CID is stored in a AAL type 2 cell.

As shown in FIG. 20(B), the header conversion apparatus 103 has a header conversion table 104 storing a new VPI, VCI (an output side VPI, VCI) corresponding to the input side VPI, VCI, CID. When a AAL type 2 cell is inputted to the header conversion apparatus 103, the header conversion apparatus 103 obtains the input side VPI, VCI, CID from the AAL type 2 cell, reads out a new VPI, VCI as data corresponding to the input side VPI, VCI, CID as an address from the header conversion table 104. The new VPI, VCI is stored in a partial fill cell.

As shown in FIG. 20(B), the header conversion apparatus has a header conversion table 104 storing a newly VPI, VCI (a output side VPI, VCI) corresponding to the input side VPI, VCI, CID. When a AAL type 2 cell inputed the header conversion apparatus 103, the header conversion apparatus 103 obtains the input side VPI, VCI, CID from the AAL type 2 cell, reads out a newly VPI, VCI as data corresponding to the input side VPI, VCI, CID as a address from the header conversion table 104. The newly VPI, VCI is stored in a partial fill cell.

However, the header conversion table 102 needs 28 bits for an address region (VPI:12 bits, VCI:16 bits), and 36 bits for the data region (VPI:12 bits, VCI:16 bits, CID:8 bits) to one ATM connection. Therefore, when all the patterns capable of being set are stored into the header conversion table 102, the conversion table 102 needs bulky memory capacity. The header conversion table 104 also needs bulky memory capacity. As a result, influence on costs is great.

The present invention has been made in view of the above-mentioned problems, and an object of the present invention is to provide a short cell multiplexing apparatus which is able to carry out switching for every short cell and to restrain an upscale of hardware.

Like a conventional method, memory volume required for the header conversion table may be reduced by restricting the number of significant digits of the VPI/VCI. However, this requires to add CID (8 bits) to the VPI/VCI, resulting in larger memory volume in the table compared with the conventional method.

SUMMARY OF THE INVENTION

The present invention has been made in view of the above-mentioned problems, and an object of the present invention is to provide a short cell multiplexing apparatus which is able to carrry out switching every a short cell and to restrain an upscale of a hardware.

The present invention employs the following configuration to solve the above described problems. Namely, the short cell multiplexing apparatus of the present invention comprises a first header converting section, a short cell multiplexing section, and a second header converting section. The first header converting section outputs, when a plurality of partial fill cells which are standard cells each storing one short cell are inputted to the first header converting section, the partial fill cells, while converting a virtual path identifier stored in each of the partial fill cells into a value that is a unit of a multiplexing process at the short cell multiplexing section, and converting a virtual connection identifier stored in each of the partial fill cells into a value to be a short cell connection identifier which is to be stored in the short cell at the short cell multiplexing section. The short cell multiplexing section receives a plurality of the partial fill cells outputted from the first header converting section to multiplex a plurality of the short cells which are stored in the partial fill cells for every virtual path identifier stored in each of the partial fill cells, and produces a cell (for example, AAL Type 2 cell) in which virtual channel identifiers of the partial fill cells are stored as the connection identifiers of the short cells and the virtual path identifiers of the partial fill cells storing the short cells are stored as the virtual channel identifiers, and outputs the cell. The second header converting section receives the cell outputted from the short cell multiplexing section and outputs the cell while converting the respective virtual path identifiers and the virtual channel identifiers which are stored in the cell into given values.

The present invention carries out header conversion for the partial fill cells and the AAL Type 2 cells so that the ATM switching apparatus may carry out ATM cell switching for every short cell. Thus, the use of the ATM switching apparatus enables routing for the short cells. In addition, in the header conversion process, no simultaneous VPI, VCI, CID storage is required for the addresses of a table for header conversion. The result reduces memory capacity required for the table to diminish the hardware configuration of the short cell multiplexing apparatus.

BRIEF DESCRIPTION OF THE DRAWINGS

In the accompanying drawings:

FIG. 3 is a table showing a header conversion process by the short cell multiplexing apparatus shown in FIG. 2;

FIG. 6 is a table showing a header conversion process by the short cell demultiplexing apparatus shown in FIG. 5;

FIG. 9 is a table showing a header conversion process by the short cell multiplexing/demultiplexing apparatus shown in FIG. 8;

FIG. 11 is a table showing a header conversion process by the short cell multiplexing/demultiplexing apparatus shown in FIG. 10;

FIG. 14 is a table showing a header conversion process by the short cell multiplexing/demultiplexing apparatus shown in FIG. 13;

FIG. 19 is a table illustrating the format shown in FIG. 18; and

DESCRIPTION OF THE PREFERRED EMBODIMENT

Now, the embodiments of the present invention are explained in detail referring to drawings.

[Embodiment 1]

Figure 1:
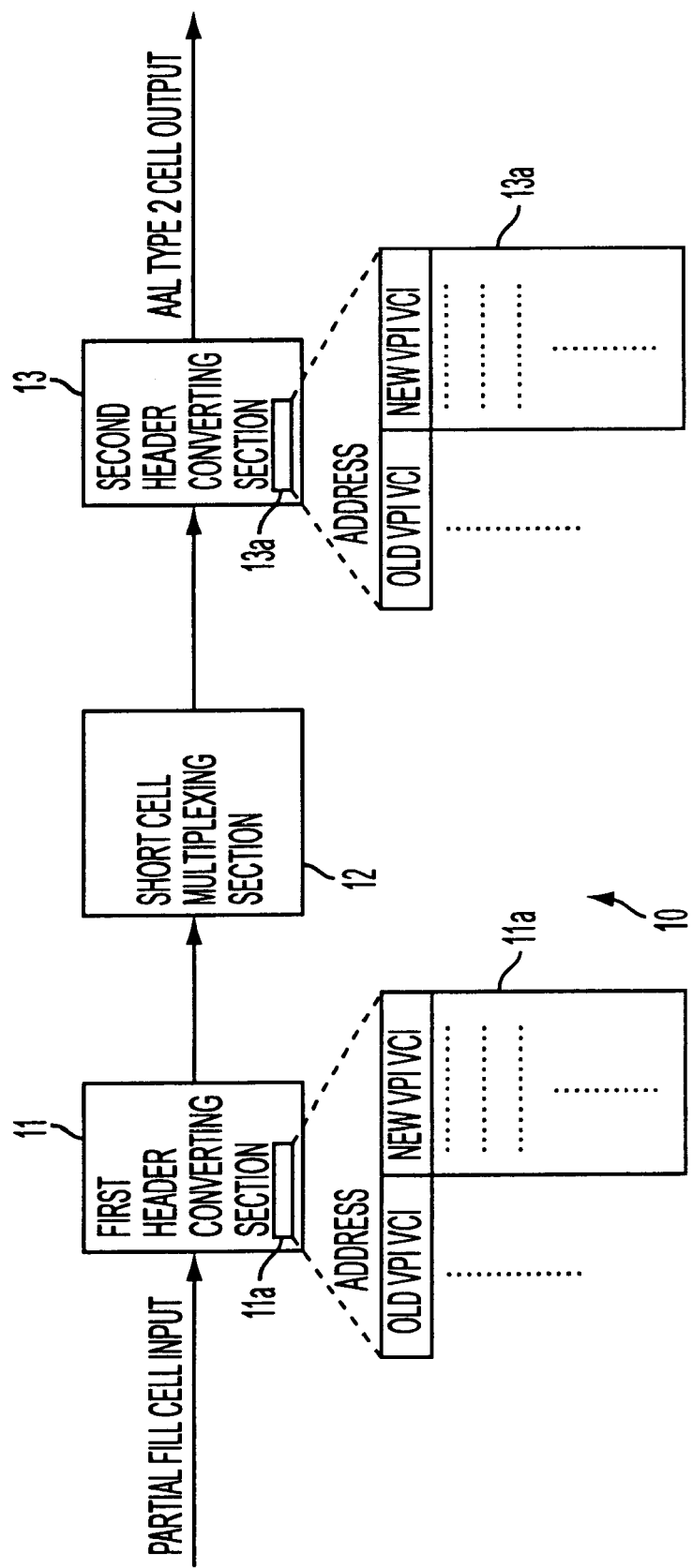
FIG. 1 is a diagram showing a short cell multiplexing apparatus according to an embodiment of the present invention.

FIG. 1 is a diagram showing a short cell multiplexing apparatus 10 of Embodiment 1 according to the present invention. In FIG. 1, the short cell multiplexing apparatus 10 comprises a first header converting section 11, a short cell multiplexing section 12 connected to the first header converting section 11, and a second header converting section 13 connected to the short cell multiplexing section 12.

A partial fill cell (see in FIG. 18) is inputted to the first header converting section 11. The first header converting section 11 has a table 11a. The table 11a stored a VPI, VCI (input side VPI, VCI) as an address and newly VPI, VCI (output side VPI, VCI) as data corresponding to the input side VPI, VCI.

The first header converting section 11 uses the table 11a, and converts the VPI stored in the header of the inputted partial fill cell. This converted VPI becomes a unit of a multiplexing process in the short cell multiplexing section 12. Namely, a value of the converted VPI becomes a value of an input VPI in the short cell multiplexing section 12. In addition, the first header converting section 11 converts the VCI stored in the header of the partial fill cell into a value to be the CID of the short cell header processed by the short cell multiplexing section 12.

The short cell multiplexing section 12 receives a plurality of partial fill cells from the first header converting section 11 to produce an AAL Type 2 cell from a plurality of the partial fill cells. Then, the short cell multiplexing section 12 collects the partial fill cells having the same VPI number to multiplex the short cells stored in the partial fill cells, and loads the multiplexed short cells in the payload of the AAL Type 2 cell.

In addition, the short cell multiplexing section 12 stores the VPI number of the partial fill cells as VCI in the header of the AAL Type 2 cell, and stores the VCI number of the partial fill cells as the CID of each short cell in each header of short cell stored in the AAL Type 2 cell. (See FIG. 2.)

The second header converting section 13 receives the AAL Type 2 cell from the short cell multiplexing section 12, uses the VPI/VCI of the AAL Type 2 cell as an address to read the corresponding new VPI/VCI from the table 13a, and stores the new VPI/VCI in the header of the AAL Type 2 cell.

The second header converting section 13 receives the AAL Type 2 cell from the short cell multiplexing section 12, uses the VPI/VCI of the AAL Type 2 cell as a aderess to read the corresponding new VPI/VCI from the table 13a, and stores the new VPI/VCI in the header of the AAL Type 2 cell.

The header converting process by the second header converting section 13 is employed in view of the fact that the VPI/VCI to be stored in the header of the AAL Type 2 cell by the short cell multiplexing section 12 contains the VPI/VCI that are not allowed to use by users. Namely, the second header converting section 13 converts the VPI/VCI stored in the header of the AAL Type 2 cell into VPI/VCI that are allowed to use in an ATM network.

The first header converting section 11, the short cell multiplexing section 12 and, the second header converting section 13 may be constituted by using a processor device consisting mainly of ICs, LSIs, or a CPU and a memory.

Figure 2:
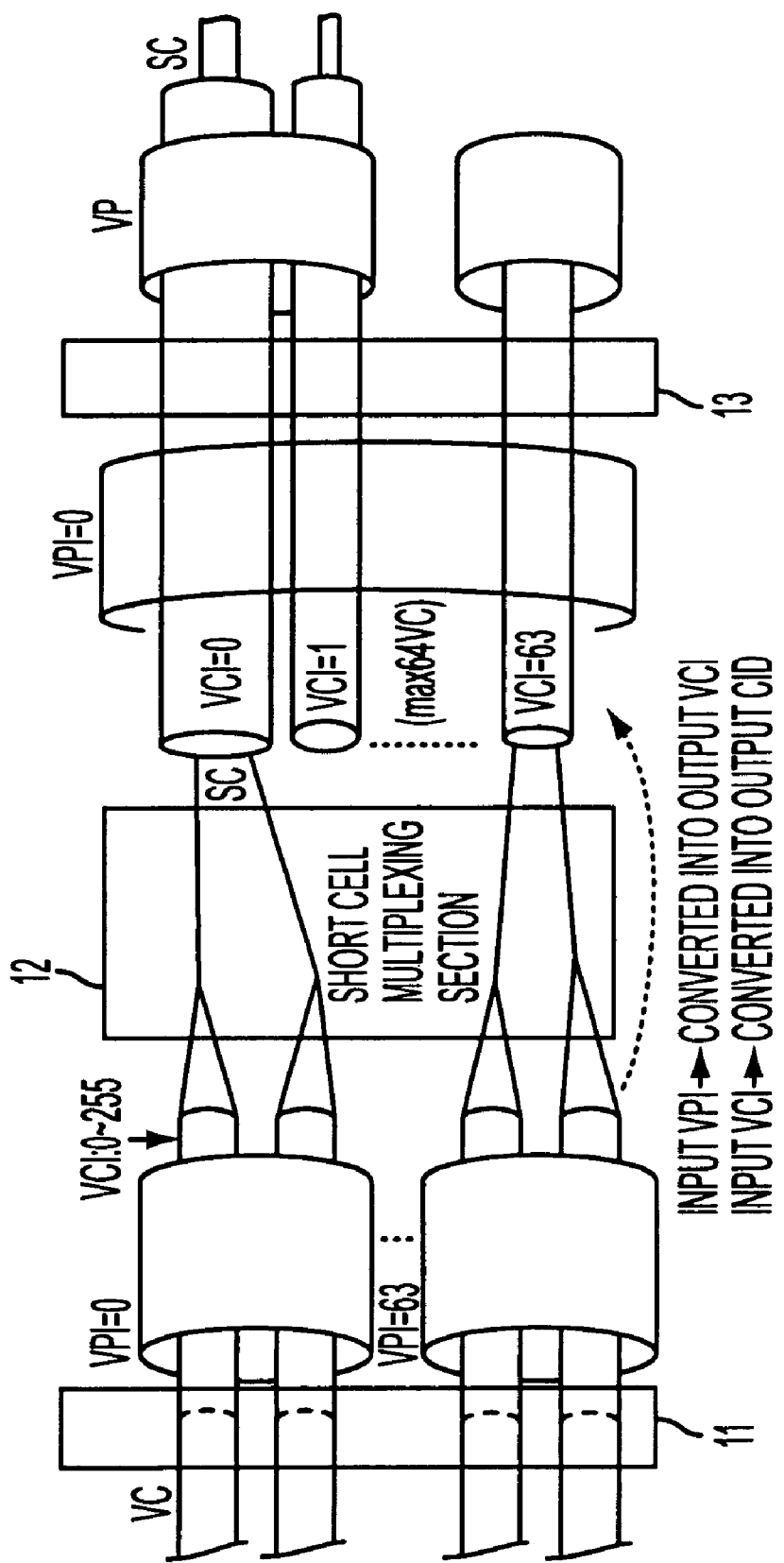
FIG. 2 is a diagram showing an example of the short cell multiplexing apparatus shown in FIG. 1.

FIG. 2 is a drawing showing an example of the short cell multiplexing apparatus 10 shown in FIG. 1. FIG. 3 is a table showing the header converting process by the short cell multiplexing apparatus 10 shown in FIG. 2. FIG. 2 shows an example in which it is possible to process 64 VPs (virtual path: VPI=0 to 63) by the short cell multiplexing section 12. It should be noted that the VPI number of the AAL Type 2 cell outputted from the short cell multiplexing section 12 is always 0 in the example. And also note that a plurality of short cells stored in a plurality of partial fill cells that are transmitted through the same VC have the same CID.

When the partial fill cells are inputted to the first header converting section 11, the first header converting section 11 converts the VPI numbers stored in the partial fill cells into VPI numbers (VPI numbers showing any one of 64 VPs: VPI=0–63) corresponding to the VPI number mentioned above. In addition, the first header converting section 11 converts the VCI number into a new VCI number.

The converted VCI number is equivalent to the CID number to be stored in the short cell by the short cell multiplexing section 12. The CID number is represented by eight bits. (See FIG. 18.) Thus, the VCI number replaced by the first header converting section 11 is any one of 0 to 255. Then, the first header converting section 11 transfers the header conversion process-applied partial fill cell to the short cell multiplexing section 12.

The short cell multiplexing section 12 stores a plurality of partial fill cells inputted from the first header converting section 11 in a buffer (not shown). In addition, the short cell multiplexing section 12 determines an ATM connection (a short cell to be read from the buffer not shown) for sending the AAL Type 2 cell for every given time in accordance with QoS (Service quality: for example, a transmitting band) of a call for transmitting the short cell. A plurality of partial fill cells having the same VPI number are read from the buffer (not shown) in accordance with the determined result.

Then, the short cell multiplexing section 12 multiplexes a plurality of short cells stored in the partial fill cells. And the AAL Type 2 cell storing the multiplexed short cells in the payload is produced. The short cell multiplexing section 12 stores the VPI numbers stored in the partial fill cells as VCI numbers in the header of the AAL Type 2 cell. The VCI numbers of the partial fill cells are stored as CIDs in each short cell header. Then, the short cell multiplexing section 12 sends the AAL Type 2 cell to the second header converting section 13.

When the second header converting section 13 receives the AAL Type 2 cell from the short cell multiplexing section 12, the second header converting section 13 converts the VPI/VCI of the AAL Type 2 cell into a desired VPI/VCI (VPI/VCI corresponding to the destination of the short cell). The second header converting section 13 then sends the VPI/VCI-converted AAL Type 2 cell. The AAL Type 2 cell is then transmitted on the ATM connection in accordance with VPI/VCI. In FIG. 3, "d.c." in the table shows that an arbitrary number is employed.

In this way, the short cell multiplexing apparatus 10 converts the VPI number of the partial fill cell inputted to the first header converting section 11 into a new VPI number to be a multiplexing unit number. A plurality of short cells stored in a plurality of partial fill cells having the same VPI number are multiplexed by the short cell multiplexing section 12. Thus, by controlling the multiplexing unit number a plurality of short cells to be multiplexed by the short cell multiplexing section 12 are freely selected.

For example, when the VPI number of each partial fill cell inputted to the first header converting section 11 through the same VPI/VCI is invariably converted into a new same VPI number (multiplexing unit number), a plurality of short cells sent from the same transmitting source may surely be multiplexed by the short cell multiplexing section 12.

The VPI number of the partial fill cell inputted to the short cell multiplexing section 12 becomes the VCI number of the AAL Type 2 cell which is to be outputted from the short cell multiplexing section 12. The VCI number of the partial fill cell which is to be inputted to the short cell multiplexing section 12 becomes the CID number of each short cell. Thus, inputting the partial fill cells having the same VPI number to the short cell multiplexing section 12, the short cells that are to be outputted from the short cell multiplexing apparatus 10 (the second header converting section 13) are transmitted on the same VC (ATM connection). Thus, the short cells having the same CID number are transmitted to the same destination.

In the short cell multiplexing apparatus 10, a table 11a in the first header converting section 11 and a table 13a in the second header converting section 13 have no CID as data, which reduces memory capacity required for the tables 11a, 13a.

[Embodiment 2]

Figure 4:
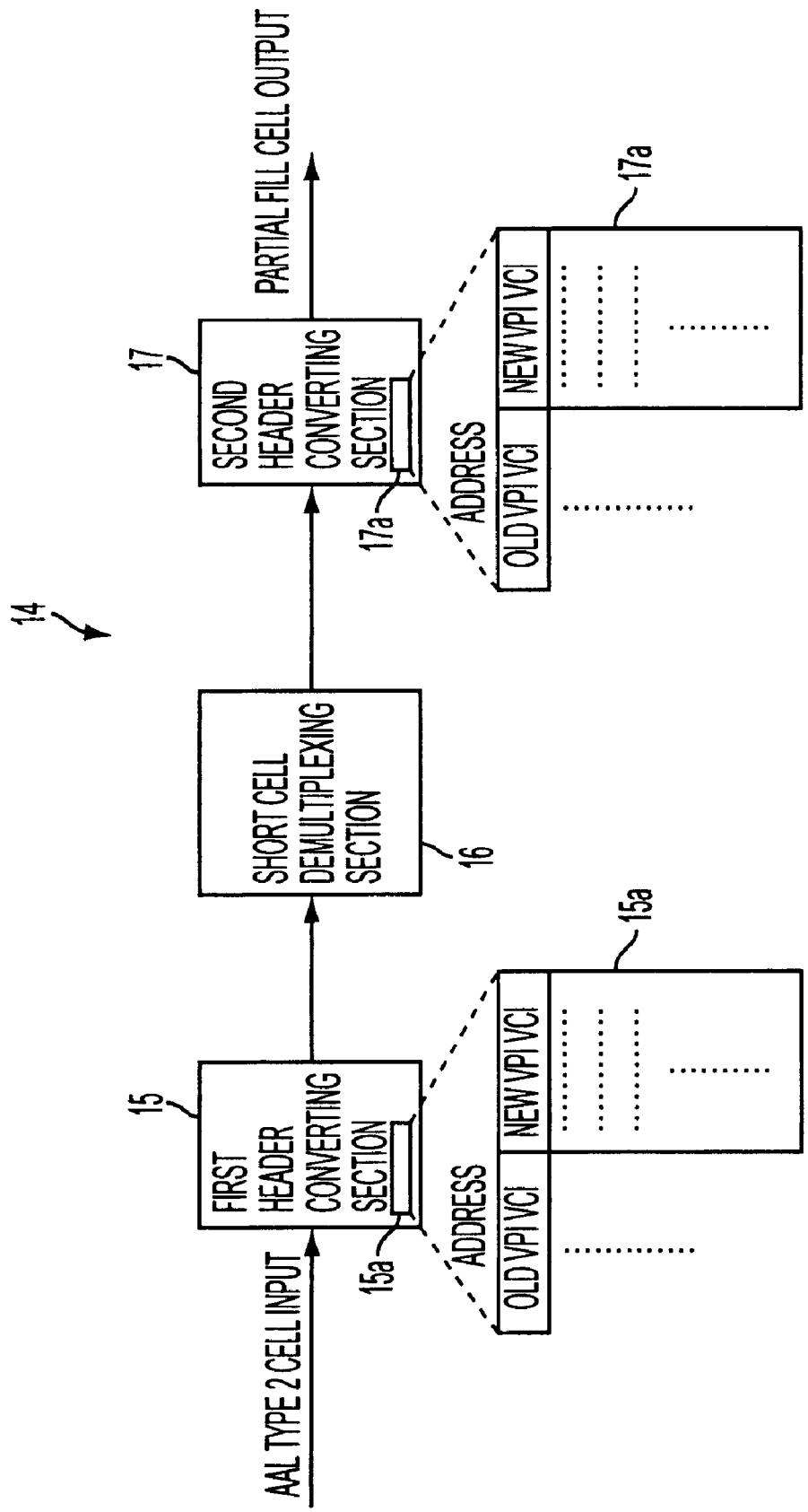
FIG. 4 is a diagram showing a short cell demultiplexing apparatus according to an embodiment of the present invention.

FIG. 4 is a structural drawing showing a short cell demultiplexing apparatus 14 according to Embodiment 2. In FIG. 4, the short cell demultiplexing apparatus 14 comprises a first header converting section 15, a short cell demultiplexing section 16 connected to the first header converting section 15, and a second header converting section 17 connected to the short cell demultiplexing section 16.

Figure 18:
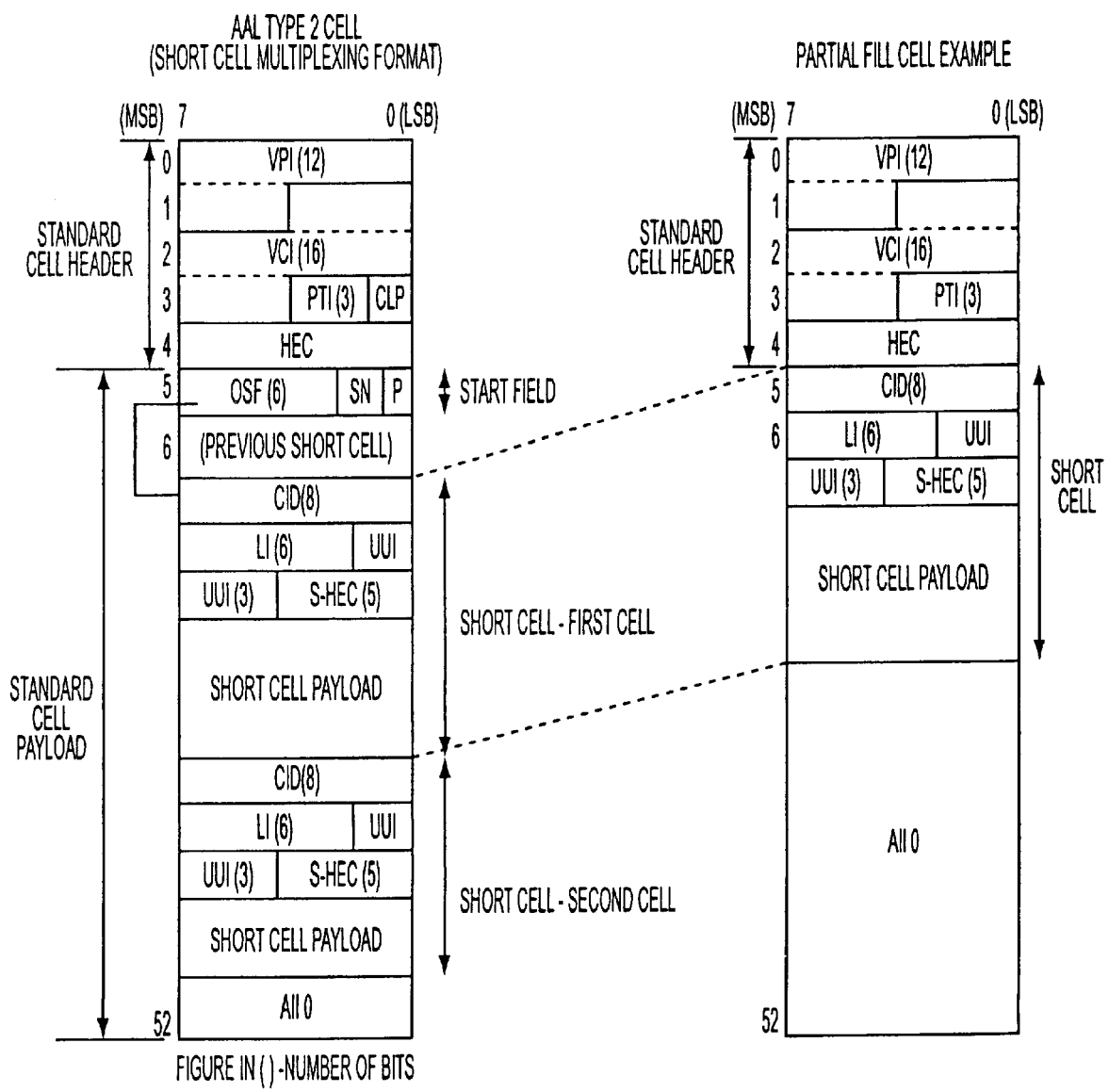
FIG. 18 is a diagram illustrating formats of an ATM AAL Type 2 cell containing short cells and a partial fill cell.
Figure 20A:
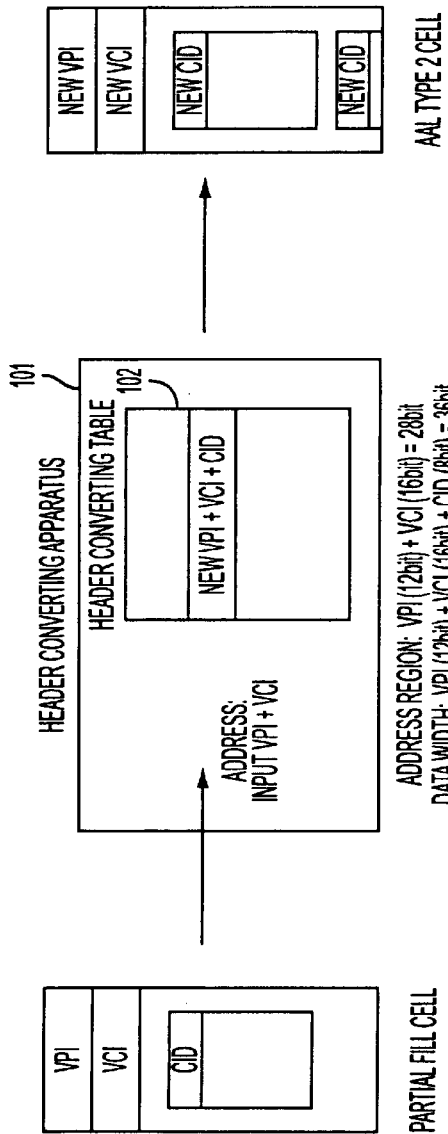
FIGS. 20(A) and 20(B) are a header conversion tables of short cell multiplexing/demultiplexing processes.
Figure 20B:
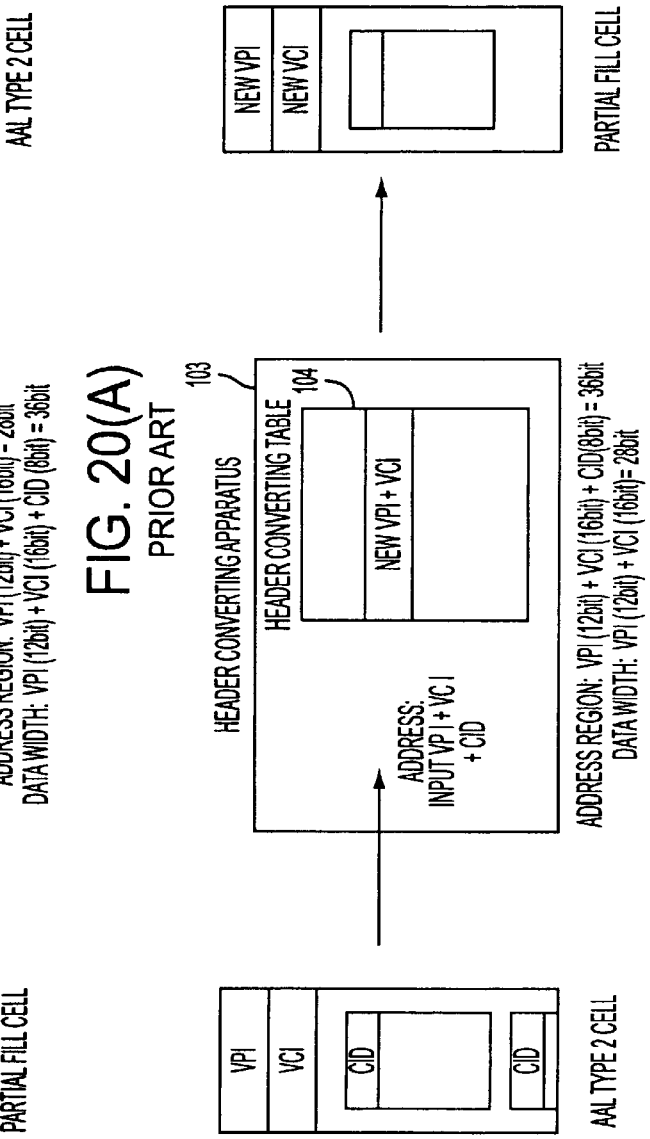

An AAL Type 2 cell shown in FIG. 18 is inputted to the first header converting section 15. The first header converting section 15 has a table 15a for conversion using VPI/VCI stored in the header of the inputted AAL Type 2 cell as an address, and using new VPI/VCI corresponding to the above VPI/VCI as data.

The first header converting section 15 converts the VPI number of the inputted AAL Type 2 cell in a new arbitrary VPI number by using the table 15a. The first converting section 15 converts the VCI number stored in the inputted AAL Type 2 cell into a new VCI number by using the table 15a. Where, the first header converting section 15 stores as new VCI number the VPI number processed by the short cell demultiplexing section 16 in the header of the AAL Type 2 cell.

The short cell demultiplexing section 16 demultiplexs the AAL Type 2 cell inputted from the first header converting section 15 into a plurality of partial fill cells. Where, the short cell demultiplexing section 16 stores the VCI stored in the AAL Type 2 cell as the VPI of each partial fill cell, and stores the CID of the short cell stored in the AAL Type 2 cell as the VCI of the partial fill cell.

The second header converting section 17 has a table 17a where VPI/VCI stored in each partial fill cell outputted from the short cell demultiplexing section 16 is used as an address and new VPI/VCI (for example, the VPI/VCI equivalent to the destination of the short cell) corresponding to the above VPI/VCI is used as data. When the second header converting section 17 receives the partial fill cell from the short cell demultiplexing section 12, the second header converting section 17 uses the VPI/VCI of the partial fill cell as a address, and reads VPI/VCI corresponding to the VPI/VCI of the partial fill cell from the table 17a and stores the VPI/VCI in the partial fill cell.

The first header converting section 15, the short cell demultiplexing section 16, and the second header converting section 17 may be constituted by a processor device consisting mainly of ICs, LSIs, or a CPU and a memory.

Figure 5:
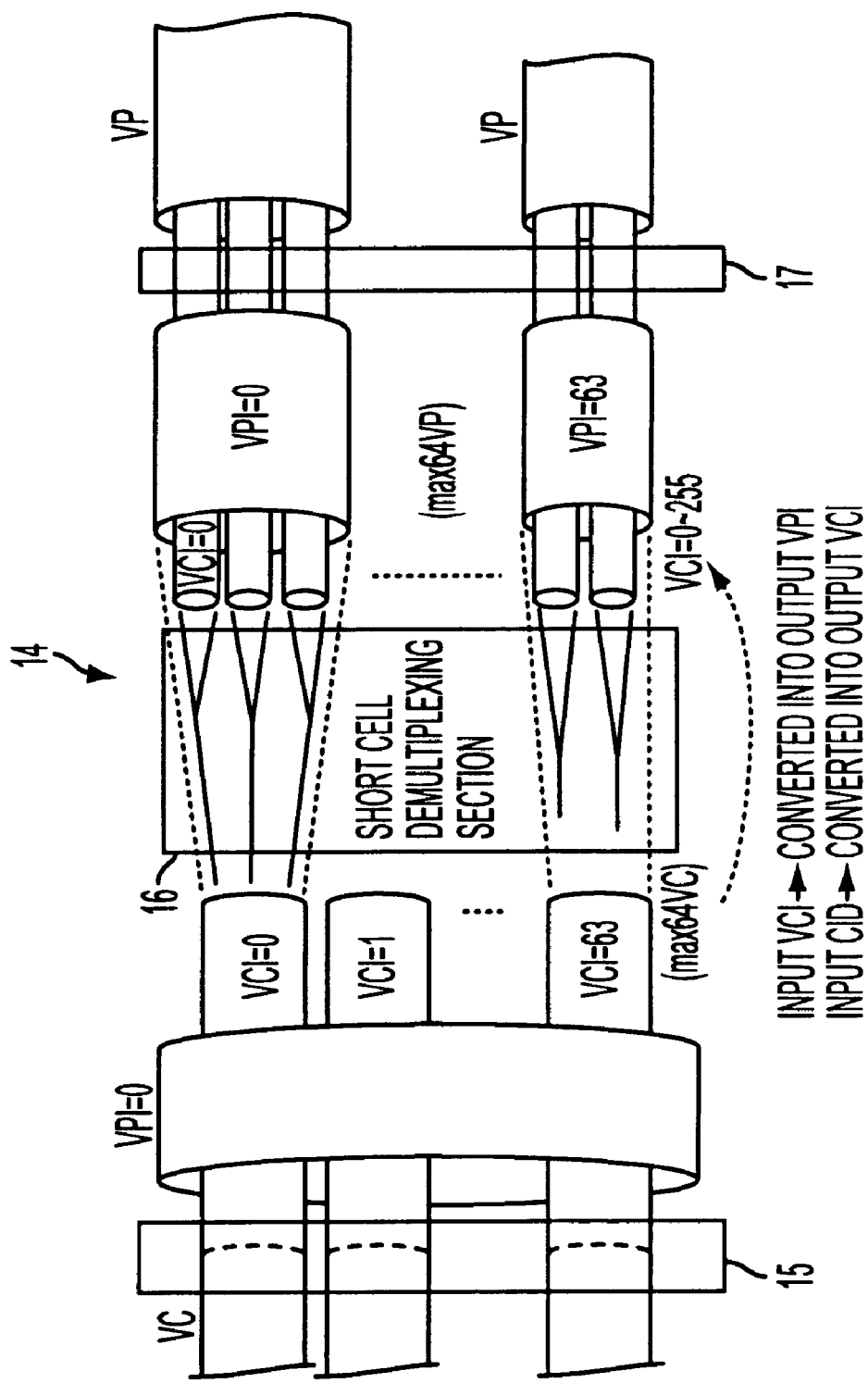
FIG. 5 is a diagram showing an example of the short cell demultiplexing apparatus shown in FIG. 4.

FIG. 5 is a drawing showing an example of the short cell demultiplexing apparatus shown in FIG. 4. FIG. 6 is a table showing the header converting process by the short cell demultiplexing apparatus 14 shown in FIG. 5. FIG. 5 shows an example in which processing 64 VCs (Virtual Channel: VCI=0–63) is possible by the short cell demultiplexing section 16. Where, the VPI number of the AAL Type 2 cell converted by the first header converting section 15 is set to always 0.

When an AAL Type 2 cell is inputted to the first header converting section 15, the first header converting section 15 converts the VPI number stored in the AAL Type 2 cell into 0. The first header converting section 15 converts the VCI number stored in the AAL Type 2 cell into a new VCI number (any one of 0 to 63) in accordance with the VPI, VCI number stored in the AAL Type 2 cell. The converted VCI number is equivalent to the VPI number to be stored in the partial fill cell by the short cell demultiplexing section 16. In this example, 0 is to be stored as the converted VCI number. The first header converting section 15 then outputs the header conversion process-applied AAL Type 2 cell to the short cell demultiplexing section 16.

When the AAL Type 2 cell outputted from the first header converting section 15 is inputted to the short cell demultiplexing section 16, the short cell demultiplexing section 16 demultiplexs the AAL Type 2 cell into a plurality of partial fill cells, and stores the VCI number, 0, stored in the AAL Type 2 cell, as VPI in each partial fill cell. The short cell demultiplexing section 16 then stores the CID number stored in each short cell as VCI number in the header of each partial fill cell. The short cell demultiplexing section 16 then sends each partial fill cell to the second header converting section 17.

When the second header converting section 17 receives the partial fill cell from the short cell demultiplexing section 16, the second header converting section 17 converts the VPI/VCI of the partial fill cell into a desired VPI/VCI, and sends the VPI/VCI-converted partial fill cell. The second header converting section 17 then transmits the partial fill cell on an ATM connection in accordance with the VPI/VCI.

Thus, the short cell demultiplexing apparatus 14 converts the AAL Type 2 cells storing a plurality of short cells into a plurality of partial fill cells. Thus, switching for every partial fill cell enables switching for every short cell, to transmit the short cell to an appropriate destination. In addition, the short cell demultiplexing apparatus 14 contains no CID as an address in the tables of the first and the second header converting section, 15, 17, depressing required memory capacity.

[Embodiment 3]

Figure 7:
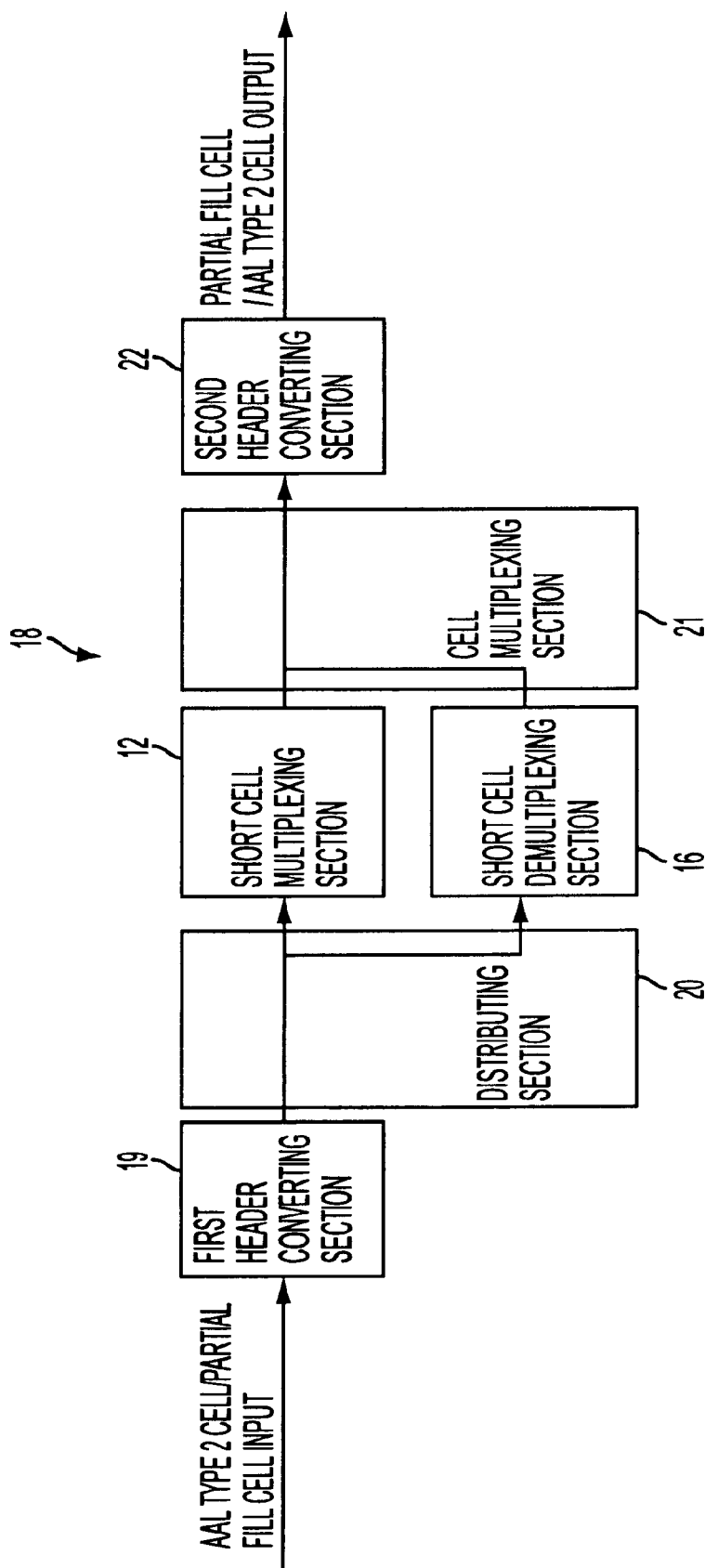
FIG. 7 is a diagaram showing a short cell multiplexing/demultiplexing apparatus according to an embodiment of the present invention.

FIG. 7 is a structural drawing of a short cell multiplexing/demultiplexing apparatus 18 of Embodiment 3. In FIG. 7, the short cell multiplexing/demultiplexing apparatus 18 comprises a first header converting section 19, a distributing section 20 connected to the first header converting section 19, a short cell multiplexing section 12 and a short cell demultiplexing section 16 which are connected to the distributing section 20, a cell multiplexing section 21 connected to the short multiplexing section 12 and the short cell demultiplexing section 16, and a second header converting section 22 connected to the cell multiplexing section 21.

The first header converting section 19 has the arrangement of the first header converting section 11 explained in Embodiment 1, and the arrangement of the first header converting section 15 explained in Embodiment 2. An AAL Type 2 cell and a partial fill cell are inputted to the first header converting section 19. When the AAL Type 2 cell is inputted to the first header converting section 19, the first header converting section 19 carries out a process as the first header converting section 11 mentioned above. When the partial fill cell is inputted to the first header converting section 19, the first header converting section 19 carries out a process as the first header converting section 15 mentioned above.

The distributing section 20 determines whether a cell inputted from the first header converting section 19 is the AAL Type 2 cell or the partial fill cell. When the cell is the AAL Type 2 cell, the distributing section 20 inputs the cell to the short cell demultiplexing apparatus 16. When the cell is the partial fill cell, the distributing section 20 inputs the cell to the short cell multiplexing section 12.

The short cell multiplexing section 12 is of the short cell multiplexing section in Embodiment 1. The short cell demultiplexing section 16 has the same arrangement as that of the short cell demultiplexing section in Embodiment 2. Thus, explanations are omitted.

The second header converting section 22 has the arrangement of the second header converting section 13 explained in Embodiment 1, and the arrangement of the second header converting section 17 explained in Embodiment 2. The AAL Type 2 cell is inputted to the second header converting section 22 from the short cell multiplexing section 12. The partial fill cell is inputted to the second header converting section 22 from the short cell demultiplexing section 16. When the AAL Type 2 cell is inputted to the second header converting section 22, the second header converting section 22 carries out a process as the second header converting section 13 mentioned above. When the partial fill cell is inputted to the second converting section 22, the second header converting section 22 carries out a process as the second header converting section 17 mentioned above.

The distributing section 20 and the cell multiplexing section 21 may be constituted by using a processor device consisting mainly of ICs, LSIs, or a CPU and a memory.

Figure 8:
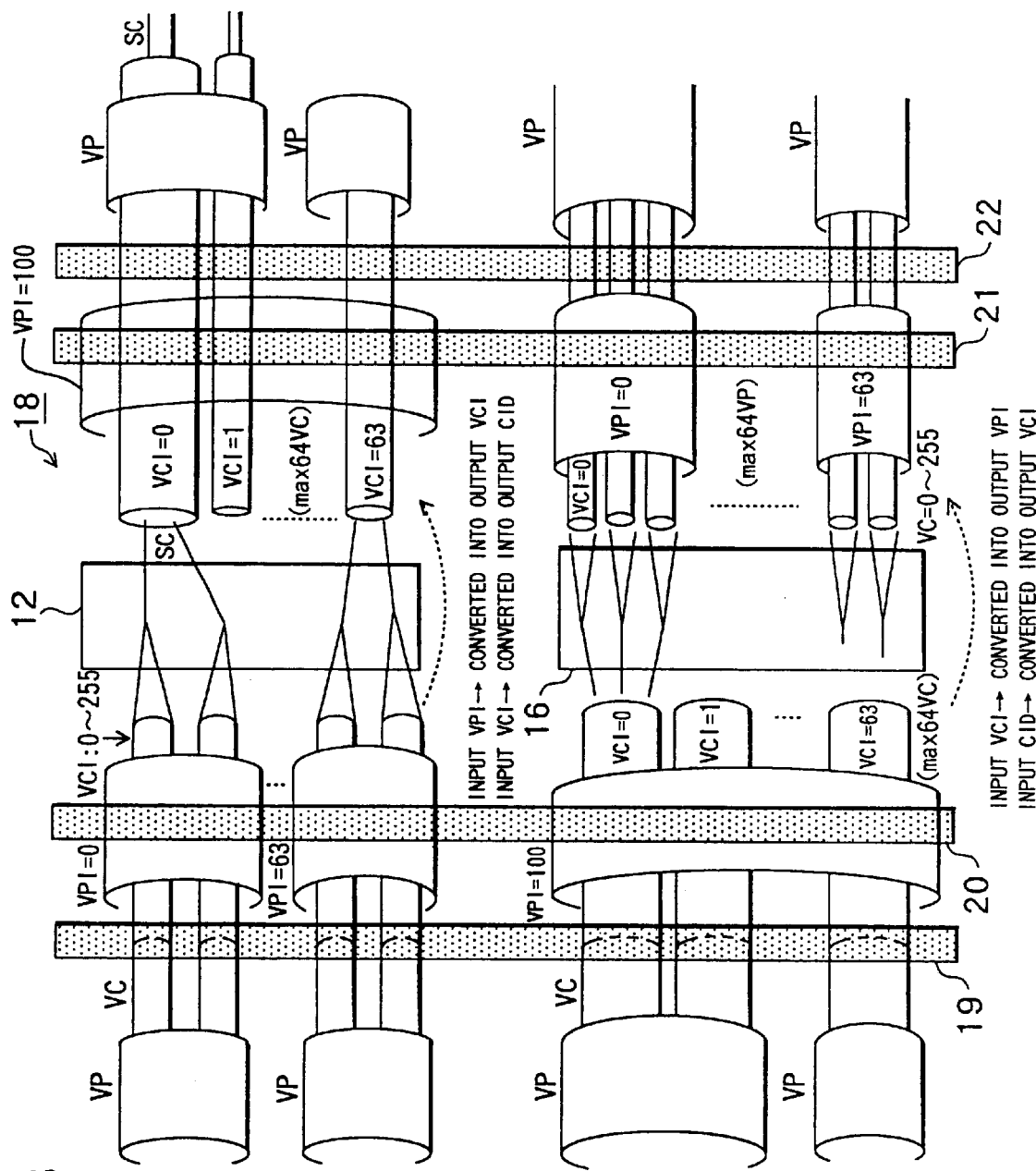
FIG. 8 is a diagram showing an example of the short cell multiplexing/demultiplexing apparatus shown in FIG. 7.

FIG. 8 is a drawing showing the example of the short cell multiplexing/demultiplexing apparatus 18 shown in FIG. 7. FIG. 9 is a table showing a header conversion process by the short cell multiplexing/demultiplexing apparatus 18 shown in FIG. 8. The short cell multiplexing/demultiplexing apparatus 18 shown in FIG. 8 sets 64 VPs (VPI=0–63) between the first header converting section 19 and the distributing section 20, and sets one VP (VPI=100) between the first header converting section 19 and the distributing section 20 so that both the VPI numbers may not coincide. The VPs having VPI numbers of 0 to 63 bundle VCs having VCI numbers of 0 to 255. The VP having VPI number 100 bundles the VCs having VCI numbers of 0 to 63.

Meanwhile, one VP (VPI=100) is set between the second header converting section 22 and the cell multiplexing section 21; and 64 VPs (VPI=0–63) are set between the second header converting section 22 and the cell multiplexing section 21 so that both the VPI numbers may not coincide. The VP having VPI number 100 bundles the VCs having VCI numbers of 0 to 63. The VPs having VPI numbers 0 to 63 bundle VCs having VCI numbers 0 to 255.

In FIG. 8 and FIG. 9, the first header converting section 19 receives the partial fill cells from the VPs at the input side corresponding to the VPs having VPI numbers of 0 to 63 mentioned above, and receives the ALL Type 2 cell from the VP corresponding to the VP having VPI number 100 mentioned above.

When the first header converting section 19 receives the partial fill cell, the VPI is converted into any number of VPI numbers 0 to 63 and also converts the VCI so that the short cell multiplexing-applied CID number may be the header conversionapplied VCI. The partial fill cell is inputted to the distributing section 20. Meanwhile, when the first header converting section 19 receives the AAL Type 2 cell, VPI number is converted into 100 and is converts the VCI so that the cell to the demultiplexing side may be uniformly identified by the converted VCI number. The AAL Type 2 cell is inputted to the distributing section 20.

The distributing section 20 monitors the VPI of the cell inputted thereinto. When VPI number is in the range of 0 to 63, the cell is inputted to the short cell multiplexing section 12. Meanwhile, when VPI number is 100, the distributing section 20 inputs the cell to the short cell demultiplexing section 16.

The short cell multiplexing section 12 carries out almost the same process as that in Embodiment 1. In this example, the VPI number of the AAL Type 2 cell to be outputted to the cell multiplexing section 21 is set to 100. (See FIG. 9.) The AAL Type 2 cell is inputted to the cell multiplexing section 21. Meanwhile, the short cell demultiplexing section 16 carries out the same process as that in Embodiment 2. The partial fill cell is inputted to the cell multiplexing section 21.

The AAL Type 2 cell inputted from the short cell multiplexing section 12 differs from the partial fill cell inputted from the short cell demultiplexing section 16 in VPI number. Thus, the cell multiplexing section 21 multiplexes the AAL Type 2 cell and the partial fill cell for inputting to the second header converting section 22.

The second header converting section 22 converts each VPI/VCI of the AAL Type 2 cell and the partial fill cell into VPI/VCI equivalent to the destination of the short cell. The AAL Type 2 cell and the partial fill cell are sent to the corresponding VP and VC. Thus, the AAL Type 2 cell and the partial fill cell are transmitted through desired ATM connections.

The short cell multiplexing apparatus 18 enables to convert from the partial fill cell to the AAL Type 2 cell and to convert from the AAL Type 2 cell to the partial fill cell.

[Embodiment 4]

Figure 10:
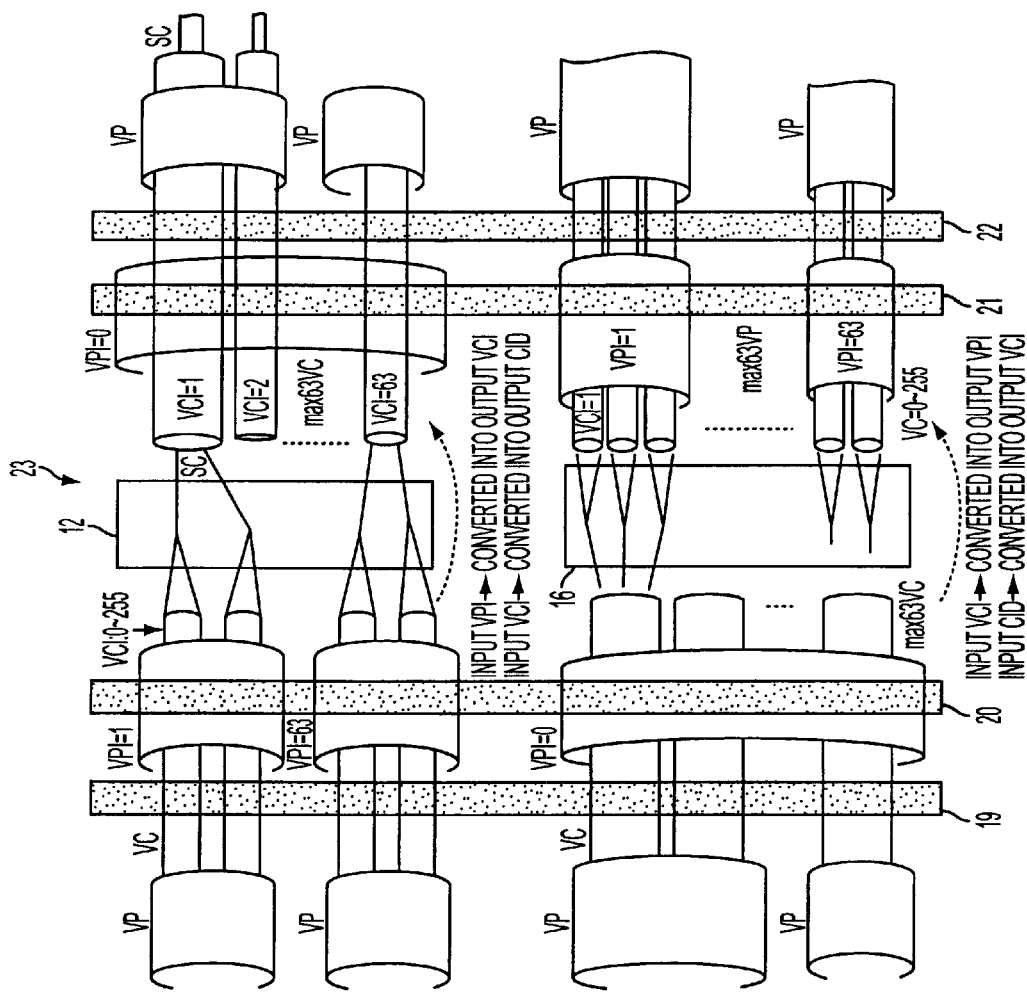
FIG. 10 is a diagram showing a short cell multiplexing/demultiplexing apparatus according to an embodiment of the present invention.

FIG. 10 is a drawing showing an example of a short cell multiplexing/demultiplexing apparatus 23 according to Embodiment 4. FIG. 11 is a table showing a header conversion process by the short cell multiplexing/demultiplexing apparatus 23 shown in FIG. 10. The short cell multiplexing/demultiplexing apparatus 23 shown in FIG. 10 has the same arrangement as that of the short cell multiplexing/demultiplexing apparatus 18 explained in Embodiment 3 except the following point:

Namely, as shown in FIG. 10, 64 VPs for connecting the first header converting section 19 to the distributing section 20 are provided. The distributing section 20 transfers the cells storing VPI numbers 1 to 63 to the short cell multiplexing section 12 and transfers the cell storing VPI number 0 to the short cell demultiplexing section 16. There are provided 64 VPs for connecting the short cell multiplexing section 12, the short cell demultiplexing section 16, and the cell multiplexing section 21 by corresponding to the number of VPs mentioned above.

As shown in FIG. 10, constituting the short cell multiplexing/demultiplexing section 23 yields 64 VPIs of 0 to 63 which are to be handled by the distributing section 20, allowing a cell distribution process by referring only to six bits in the VPI storage area of the cell inputted to the distributing section 20. (The distributing section 20 of the short cell multiplexing/demultiplexing section 18 shown in FIG. 8 carries out the cell distribution process by referring to seven bits in the VPI storage area of the cell.)

The short cell multiplexing section 12 stores VPI number 0 in the cell to be outputted from the short cell multiplexing section 12. Thus, the short cell multiplexing/demultiplexing apparatus 23 in Embodiment 4 reduces hardware scale (memory capacity) compared with the short cell demultiplexing apparatus 18 in Embodiment 3.

[Embodiment 5]

Figure 12:
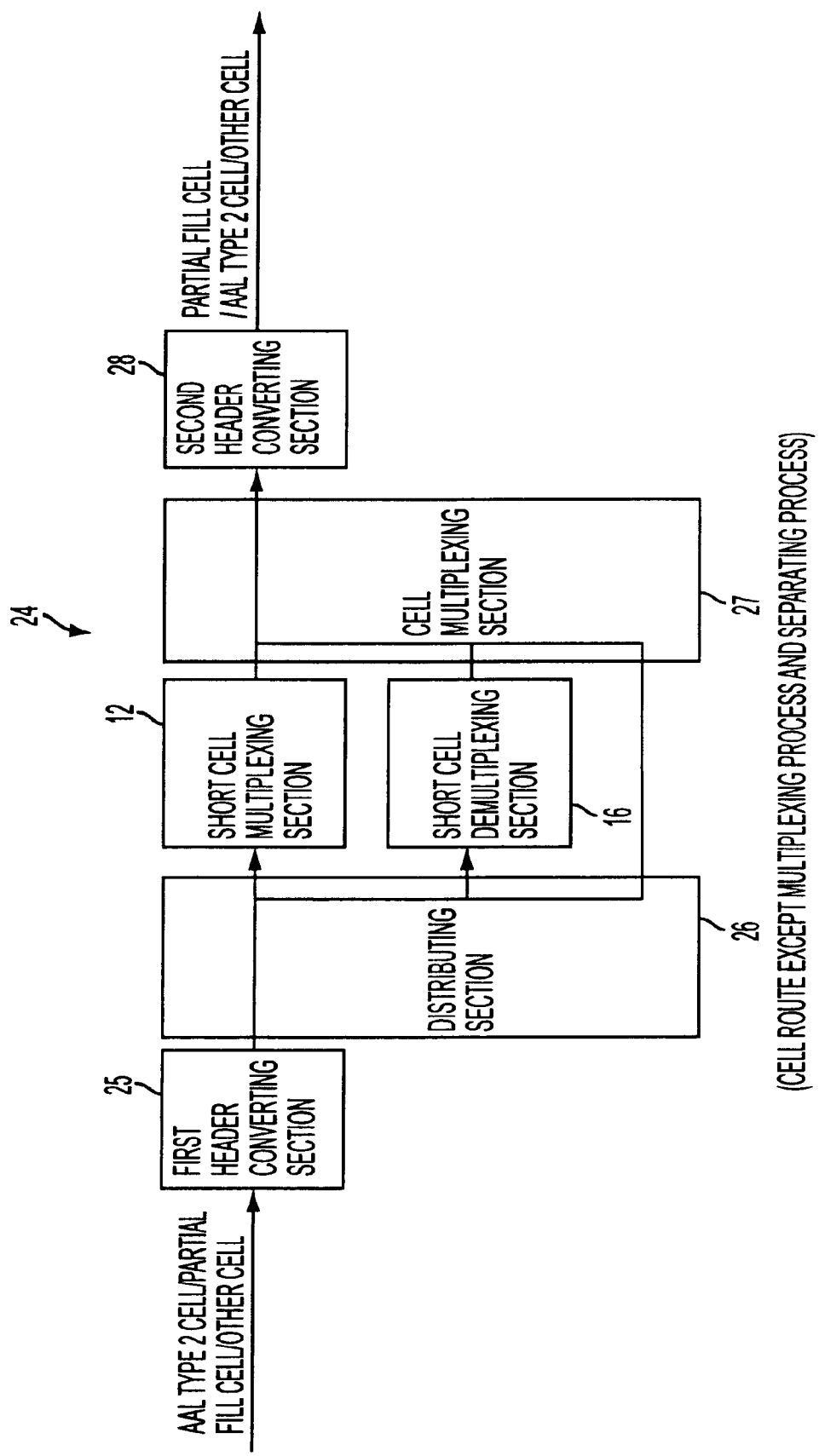
FIG. 12 is a diagram showing a short cell multiplexing/demultiplexing apparatus according to an embodiment of the present invention.
Figure 13:
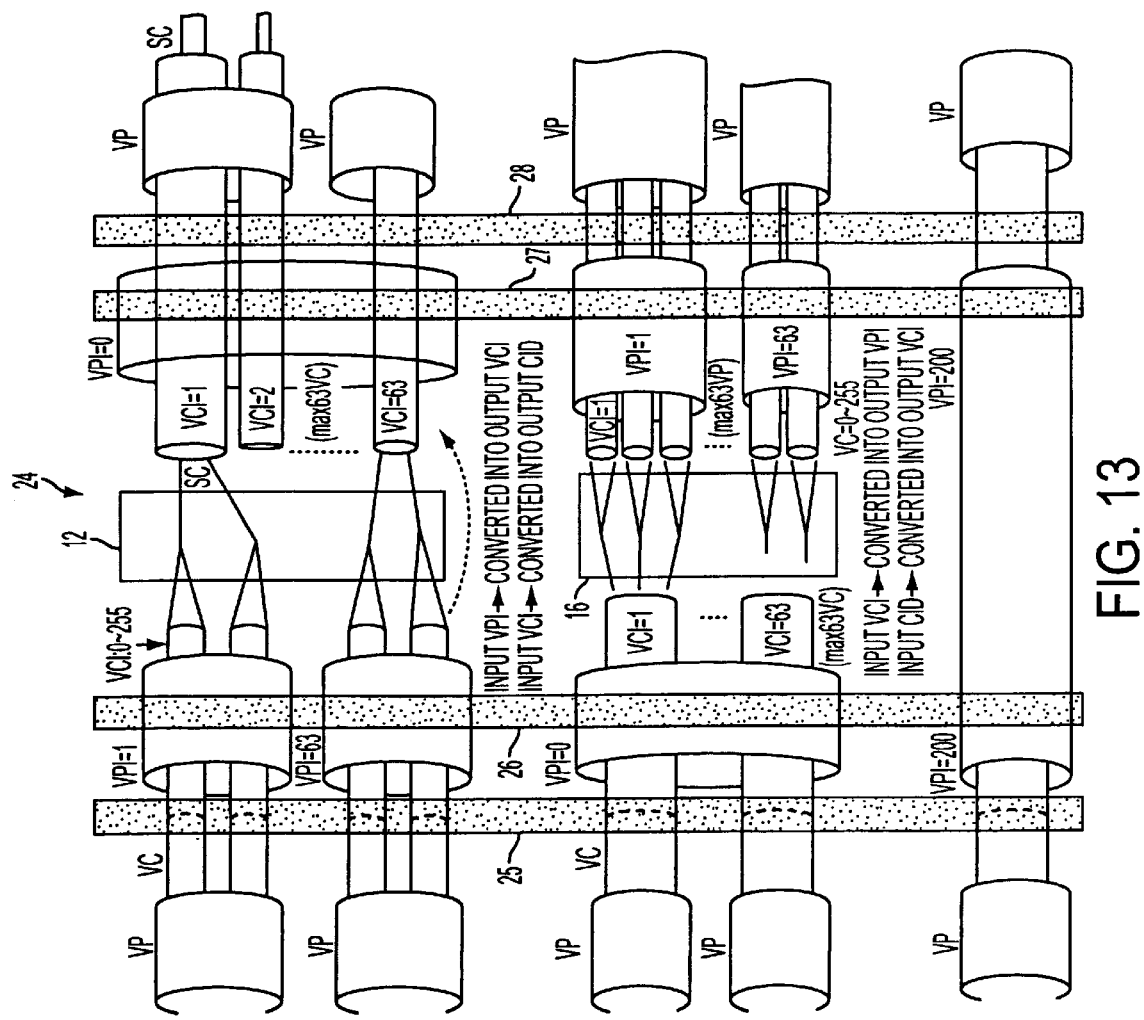
FIG. 13 is a diagram showing an example of the short cell multiplexing/demultiplexing apparatus shown in FIG. 12.

FIG. 12 is a structural drawing of a short cell multiplexing/demultiplexing apparatus 24 in Embodiment 5. FIG. 13 is a drawing showing an example of the short cell multiplexing/demultiplexing apparatus 24 shown in FIG. 12. FIG. 14 is a table showing a header conversion process by the short cell multiplexing/demultiplexing apparatus 24 shown in FIG. 13.

As shown in FIG. 12 and FIG. 13, the short cell multiplexing/demultiplexing apparatus 24 has almost the same arrangement as that of the short cell multiplexing/demultiplexing apparatus 23 explained in Embodiment 4 except, the following point: Namely, the short cell multiplexing/demultiplexing apparatus 24 is provided with routes (transmitting paths) for transmitting cells (for example, a standard cell, and an AAL Type 5 format cell)

having formats other than the AAL Type 2 cell and the partial fill cell. In the routes, the route from the distributing section 26 to the cell multiplexing section is composed of a VP having VPI number 200 so that other VPs (VPI numbers 0 to 63) connecting a first header converting section 25 to a distributing section 26 may not coincide with in VPI number.

The operation of the short cell multiplexing/demultiplexing apparatus 24 in Embodiment 5 is the same as that of the short cell multiplexing/demultiplexing apparatus 23 explained in Embodiment 4 except the following point: Namely, as shown in FIG. 14, when the first header converting section 25 receives, for example, the ALL Type5 format cell, the first header converting section 25 converts the VPI number stored in the cell into 200 and also converts the VCI stored in the cell into a new VCI number to input the cell to the distributing section 26.

When the cell is inputted, the distributing section 26 refers to the VPI number stored in the cell. When the VPI number is 200, the cell is inputted to a cell multiplexing section 27. Then, the cell of the AAL Type5 format cell inputted to the cell multiplexing section 27 is inputted to a second header converting section 28. The VPI/VCI are converted into new VPI/VCI equivalent to a destination by the second header converting section 28, and the cell is then sent to the corresponding VP, VC.

Embodiment 5 may be applied to header conversion for the standard cell or the AAL Type5 format cells in addition to the effects of Embodiments 1 to 4.

[Embodiment 6]

Figure 15:
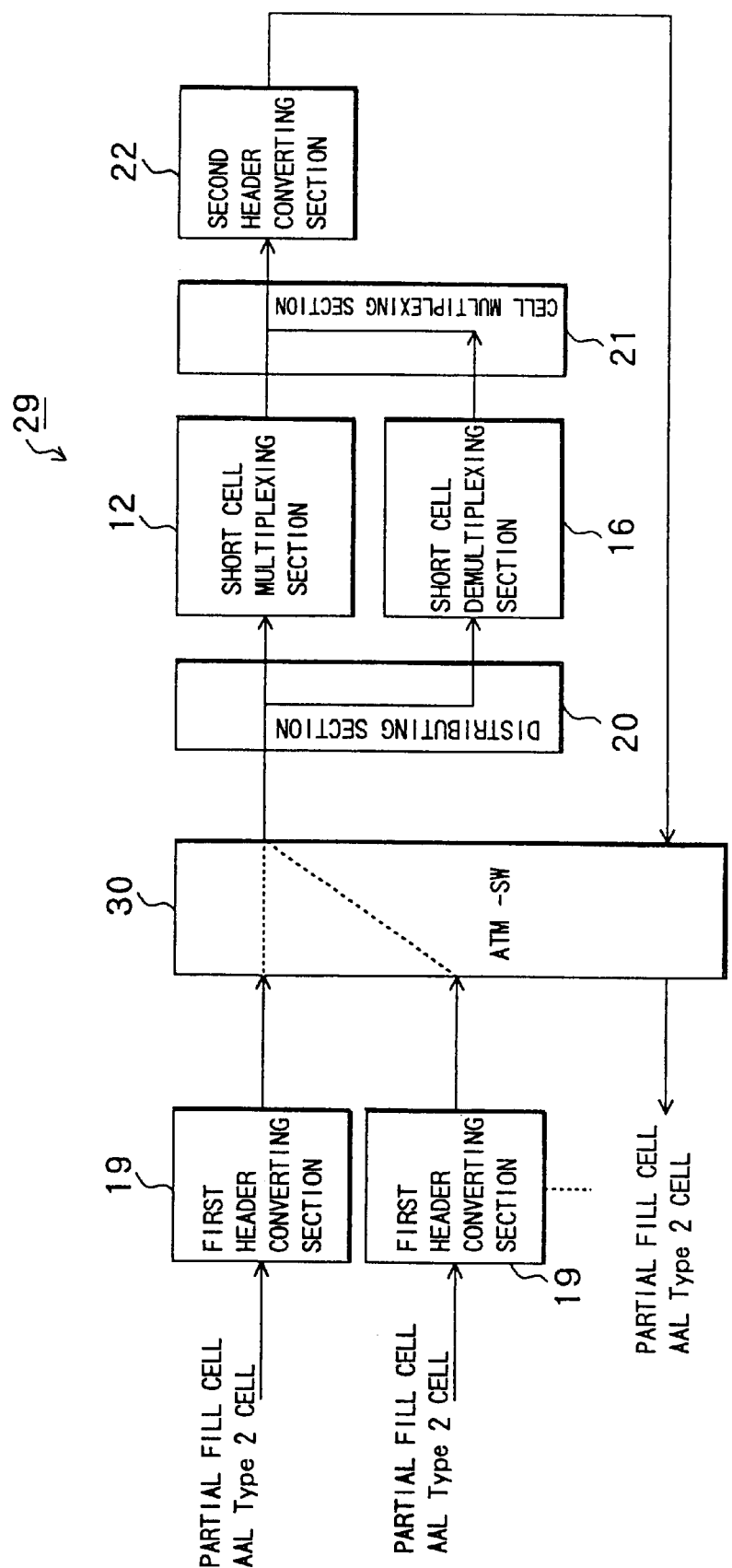
FIG. 15 is a diagram showing a short cell multiplexing/demultiplexing apparatus according to an embodiment of the present invention.
Figure 16:
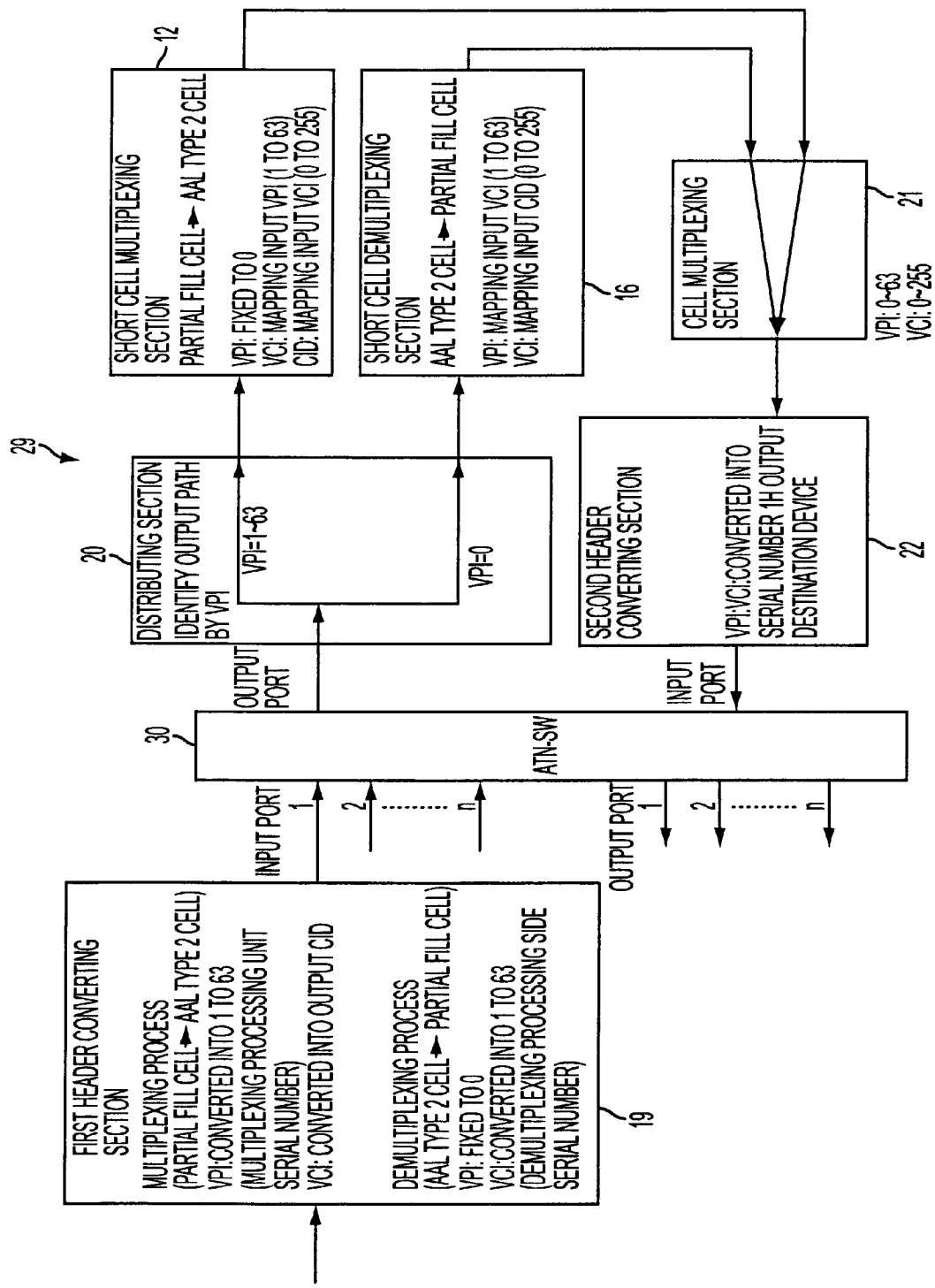
FIG. 16 is a diagram showing an example of the short cell multiplexing/demultiplexing apparatus shown in FIG. 15.
Figure 17:
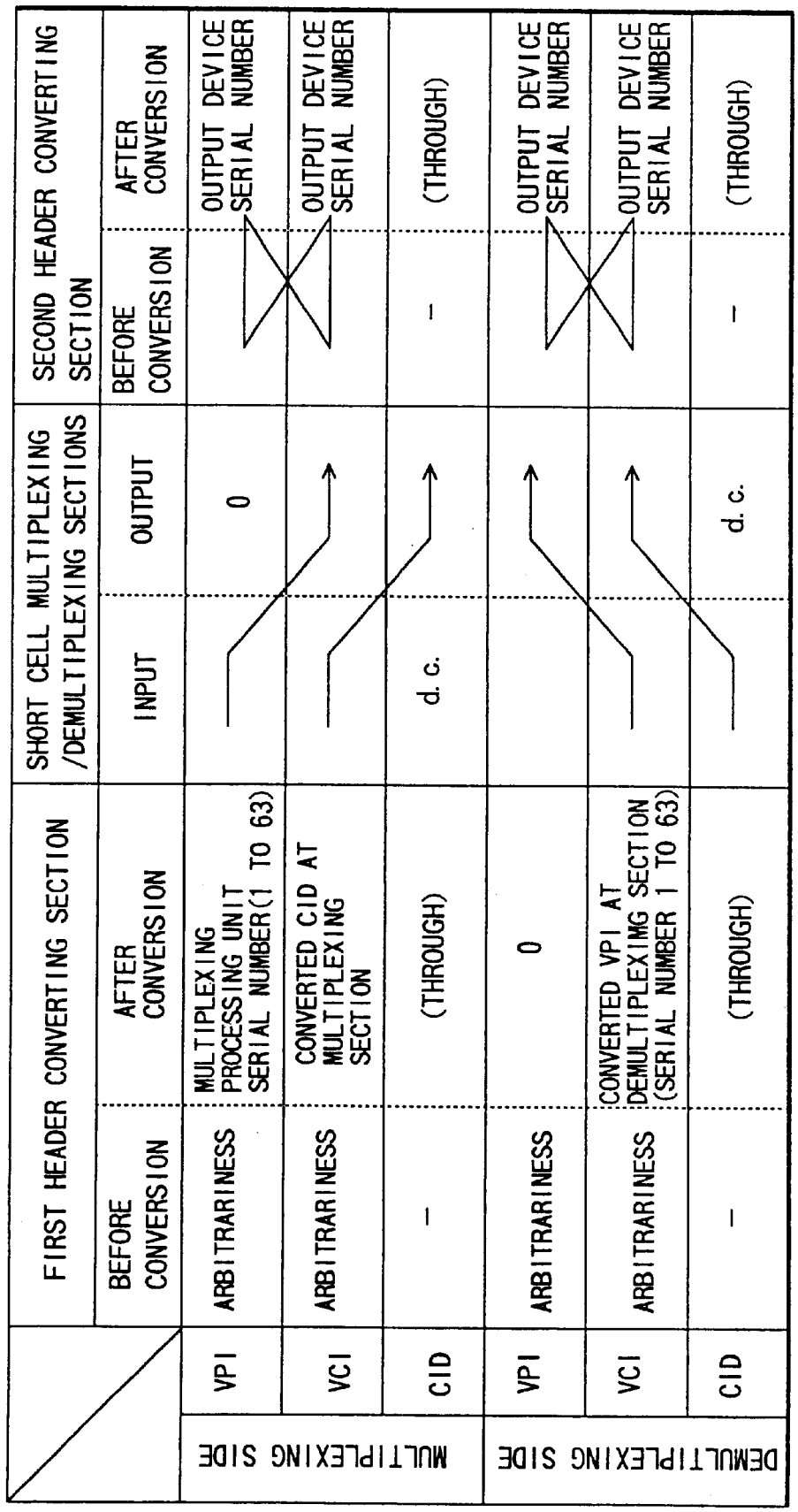
FIG. 17 is a table showing a header conversion process by the short cell multiplexing/demultiplexing apparatus shown in FIG. 16.

FIG. 15 is a structural drawing of a short cell multiplexing/demultiplexing apparatus 29 of Embodiment 6. FIG. 16 is a diagram showing an example of the short cell multiplexing/demultiplexing apparatus 29 shown in FIG. 15. FIG. 17 is a table showing a header conversion process by the short cell multiplexing/demultiplexing apparatus 29 shown in FIG. 16.

In the short cell multiplexing/demultiplexing apparatus 29 shown in FIG. 15, an ATM switch (ATM-SW) 30 is provided at the downstream stage of the first header converting section 19 shown in FIG. 7. The distributing section 20, the short cell multiplexing section 12, the short cell demultiplexing section 16, the cell multiplexing section 21, and the second header converting section 22 shown in FIG. 7 are provided at the downstream stage of the ATM-SW 30. The partial fill cell and the AAL Type 2 cell which are outputted from the second header converting section 22 are inputted to the ATM-SW 30.

In the short cell multiplexing/demultiplexing apparatus 29, as shown in FIG. 16, the AAL Type 2 cell or the partial fill cell is inputted to the first header converting section 19. The first header converting section 19 converts the header of the partial fill cell into VPI (any of 1 to 63) to be a unit for a multiplexing process and converts the VCI so that the VCI may be the short cell multiplex-applied CID. Similarly, the first header converting section 19 converts the header of the AAL Type 2 cell by fixing the VPI to 0 and converts the VCI so that the VCI may be short cell separation number (demultiplexing process serial number: any of 1 to 63). (See FIG. 17.)

The ATM-SW 30 switches the cells inputted from the first header converting section 19 to an output port connected to the distributing section 20 in accordance with the header information. The operation of the distributing section 20 and its downstream sections are the same as those in Embodiment 4. The second header converting section 22 converts the VPI/VCI of each cell into desired VPI/VCI equivalent to the destination. (See FIG. 17.) The cells are inputted to the ATM-SW 30. The cells are outputted from the desired port by the ATM-SW 30.

The short cell demultiplexing apparatus 29 enables short cell header conversion when the short cell multiplexing section 12 and the short cell demultiplexing section 16 are placed at the downstream stage of the ATM-SW 30 in addition to effects in Embodiments 1 to 5.

What is claimed is:

1. A short cell multiplexing apparatus comprising:
   a first header converting section;
   a short cell multiplexing section; and
   a second header converting section,
   wherein said first header converting section output's, when a plurality of partial fill cells which are standard cells each storing one short cell are inputted in the first header converting section, the partial fill cells, while converting a value of a virtual path identifier stored in each of the partial fill cells into a value that is a unit of a multiplexing process at said short cell multiplexing section, and converting a value of a virtual connection identifier stored in each of the partial fill cells into a value to be a short cell connection identifier which is to be stored in the short cell at said short cell multiplexing section;
   wherein said short cell multiplexing section receives a plurality of the partial fill cells outputted from said first header converting section to multiplex a plurality of the short cells stored in the partial fill cells for every virtual path identifier which is stored in each of the partial fill cells, produces a cell in which virtual channel identifiers of the partial fill cells are stored as the connection identifiers of the short cells, and the virtual path identifiers of the partial fill cells storing the short cells are stored as the virtual channel identifiers, and outputs the cell; and
   wherein said second header converting section receives the cell outputted from said short cell multiplexing section, and outputs the cell while converting the respective virtual path identifiers and virtual channel identifiers which are stored in the cell into given values.

2. A short cell multiplexing apparatus according to claim 1, wherein said first header converting section receives an AAL Type 2 format cell storing a plurality of multiplexed short cells, converts a virtual channel identifier stored in the AAL Type 2 format cell into a value capable of being identified by the connection of the AAL Type 2 format cell by using the conversion process-applied virtual channel identifier only, and outputs the AAL Type 2 format cell;
   said short cell multiplexing apparatus further comprises a short cell demultiplexing section which receives the AAL Type 2 format cell outputted from said first header converting section, produces partial fill cells each storing one short cell which is stored in the AAL Type 2 format cell, and outputs the partial fill cells while storing the virtual channel identifier of the AAL Type 2 format cell as a virtual path identifier in each of the partial fill cells, and storing a connection identifier of the short cell being stored in the partial fill cells as the virtual channel identifier in each of the partial fill cells; and
   wherein said second header converting section receives the partial fill cells outputted from said short cell demultiplexing section, and outputs the partial fill cells while converting the respective virtual path identifiers and virtual channel identifiers which are stored in the partial fill cells into given values.

3. A short cell multiplexing apparatus according to claim 2, wherein said first header converting section converts a virtual path identifier so that the virtual path identifier of a conversion process-applied partial fill cell and an AAL Type 2 format cell virtual path identifier may not coincide; and said short cell multiplexing apparatus further comprises a distributing section for inputting the partial fill cell to said short cell multiplexing section, and inputting the AAL Type 2 format cell to said short cell demultiplexing section in accordance with the virtual path identifiers stored in the partial fill cell and the AAL Type 2 format cell which are outputted from said first header converting section.

4. A short cell multiplexing apparatus according to claim 3, wherein said first header converting section has power of two pieces of virtual path identifiers, uses any of the power of two pieces of the virtual path identifiers as a specific value to convert the virtual path identifier of an AAL Type 2 format cell, and uses a value other than the specific value to convert the virtual path identifier of a partial fill cell; and wherein said distributing section inputs, among the cells inputted thereinto, the cell having the specific value as the virtual path identifier to said short cell demultiplexing section and inputs the cell having the value other than the specific value as the virtual path identifier to said short cell multiplexing section.

5. A short cell multiplexing apparatus according to claim 2, further comprises a cell multiplexing section for multiplexing an AAL Type 2 format cell outputted from said short cell multiplexing section and a partial fill cell outputted from said short cell demultiplexing section to input to said second header converting section.

6. A short cell multiplexing apparatus accoding to claim 2, wherein said first header converting section receives a cell other than a partial fill cell and an AAL Type 2 format cell, outputs the cell while converting virtual path identifiers and virtual channel identifiers which are stored in the cell into given values.

7. A short cell multiplexing apparatus according to claim 2 having a plurality of said first header converting sections, further comprises an ATM switch for receiving a partial fill cell and an AAL Type 2 format cell which are outputted from each of the first header converting sections, outputting the partial fill cell and the AAL Type 2 format cell to said distributing section, receiving the partial fill cell and the AAL Type 2 format cell which are outputted from said second header converting section, and outputting the partial fill cell and the AAL Type 2 format cell from given output paths.

8. A short cell demultiplexing apparatus comprising:
a first header converting section,
a short cell demultiplexing section, and a second header converting section,
wherein said first header converting section receives a cell storing a plurality of multiplexed short cells, converts a virtual channel identifier stored in the cell into a value so that said short cell demultiplexing section may identify the connection of each short cell stored in the cell by using the converted virtual channel identifier, and outputs the header-converted cell to said short cell demultiplexing section;
wherein said short cell demultiplexing section receives the cell outputted from said first header converting section, produces standard cells storing the short cell stored in the cell one by one, stores the virtual channel identifier of said cell as a virtual path identifier in each standard cell, stores a connection identifier of the short cell being stored in the standard cell as the virtual channel identifier in each standard cell, and outputs each standard cell to said second header converting section; and
wherein said second header converting section receives the standard cells outputted from said short cell demultiplexing section and outputs the standard cells while converting the respective virtual path identifiers and virtual channel identifiers which are stored in the standard cells into given values.

9. A short cell header converting method for transferring a short cell stored in an ATM cell toward a destination of the short cell comprising:
a first step of converting a virtual path identifier stored in a partial fill cell which is a standard cell storing one short cell into a value that is a unit of a multiplexing process at said short cell multiplexing section;
a second step of converting a virtual connection identifier stored in the partial fill cell into a value to be a short cell connection identifier being stored in the short cell at said short cell multiplexing section;
a third step of multiplexing a plurality of short cells stored in a plurality of partial fill cells through the second step for every virtual path identifier stored in the partial fill cells;
a fourth step of producing a cell storing the virtual path identifiers of the partial fill cells storing the multiplexed short cells in the third step as virtual channel identifiers, storing the virtual channel identifiers of the partial fill cells storing the short cells as short cell connection identifies; and
a fifth step of outputting the cell while converting the respective virtual path identifiers and virtual channel identifiers which are stored in the cell produced in the fourth step into given values.

10. A short cell header converting method according to claim 9 further comprising:
a sixth step of converting a virtual channel identifier stored in an AAL Type 2 format cell storing a plurality of multiplexed short cells into a value capable of identifying the connection of the AAL Type 2 format cell by using the converted. virtual channel identifier only;
a seventh step of producing partial fill cells each storing one short cell stored in the AAL Type 2 format cell through the sixth step;
an eighth step of storing the virtual channel identifier of the AAL Type 2 format cell as a virtual path identifier in each of the partial fill cells produced in the seventh step;
a ninth step of storing the connection identifier of the short cell being stored in the partial fill cells produced in the seventh step as the virtual channel identifier in each of the partial fill cells; and
a tenth step of outputting the partial fill cells while converting the respective virtual path identifiers and virtual channel identifiers which are stored in the partial fill cells through the ninth step into given values.

11. A short cell header converting method for transferring a short cell stored in an ATM cell toward a destination of the short cell comprising:
a first step of converting a virtual channel identifier stored in a cell storing a plurality of multiplexed short cells into a value capable of identifying the connection of the cell by using the converted virtual channel identifier;

a second step of producing standard cells each storing one short cell stored in the cell through the first step;

a third step of storing the virtual channel identifier of the cell obtained through the first step as a virtual path identifier in each standard cell produced in the second step;

a fourth step of storing a connection identifier of the short cell being stored in the standard cells produced in the third step as the virtual channel identifier in each of the standard cells; and a fifth step of outputting the standard cells while converting the respective virtual path identifiers and virtual channel identifiers which are stored in the standard cells through the fourth step into given values.

* * * * *